United States Statutory Invention Registration [19]

[11] Reg. Number: H75

Grisham et al. [45] Published: Jun. 3, 1986

[54] NUCLEAR DIAGNOSTIC FOR FAST ALPHA PARTICLES

[75] Inventors: Larry R. Grisham, Lawrence Township, Mercer County; Douglass E. Post, Jr., Belle Mead, both of N.J.; John M. Dawson, Pacific Palisades, Calif.

[73] Assignee: The United States of America as respresented by the United States Department of Energy, Washington, D.C.

[21] Appl. No.: 814,588

[22] Filed: Dec. 30, 1985

Related U.S. Application Data

[63] Continuation of Ser. No. 554,851, Nov. 23, 1983, abandoned.

[51] Int. Cl.[4] ..... G21B 1/00; G21G 1/10

[52] U.S. Cl. ..... 376/143; 376/157

[56] References Cited

U.S. PATENT DOCUMENTS

| | | | |
|---|---|---|---|
| 3,247,380 | 4/1966 | Amiel et al. | 376/157 |
| 3,849,655 | 11/1974 | Martucci | 376/157 |
| 3,987,590 | 10/1976 | Chianelli | 376/152 |
| 4,263,095 | 4/1981 | Thode | 376/152 |
| 4,390,567 | 6/1983 | Liepins | 376/152 |
| 4,459,258 | 7/1984 | Zeits et al. | 376/157 |

OTHER PUBLICATIONS

Physics Letters, vol. 75A, No. 1, 2, 12/79, pp. 63, 64, Hammerling.

Laser Fusion, Book Two, May 1980, pp. 30–38, 40–48, 50–57, 78–83.

PPPL-1962, 12/82, Grisham et al., pp. 1–12.

IAEA-CN-33/F1, 1974, vol II, pp. 317–335, Charatis et al.

*Primary Examiner*—Harvey E. Behrend

*Attorney, Agent, or Firm*—Hugh W. Glenn; Paul A. Gottlieb; Judson R. Hightower

[57] ABSTRACT

Measurement of the velocity distribution of confined energetic alpha particles resulting from deuterium-tritium fusion reactions in a magnetically contained plasma is provided. The fusion plasma is seeded with energetic boron neutrals for producing, by means of the reaction $^{10}B$ ($\alpha$,n) $^{13}N$ reaction, radioactive nitrogen nuclei which are then collected by a probe. The radioactivity of the probe is then measured by conventional techniques in determining the energy distribution of the alpha particles in the plasma. In a preferred embodiment, diborane gas ($B_2H_6$) is the source of the boron neutrals to produce $^{13}N$ which decays almost exclusively by positron emission with a convenient half-life of 10 minutes.

12 Claims, 10 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NUCLEAR DIAGNOSTIC FOR FAST ALPHA PARTICLES

CONTRACTUAL ORIGIN OF THE INVENTION

The United States Government has rights in this invention under Contract No. DE-AC02-76-CHO3073 between the U.S. Department of Energy and Princeton University.

This is a continuation of application Ser. No. 554,851 filed Nov. 23, 1983, now abandoned.

BACKGROUND OF THE INVENTION

This invention relates generally to high energy confined plasmas and more particularly is directed to measuring the velocity distribution of confined energetic alpha particles resulting from deuterium-tritium fushion reactions in a confined energetic plasma.

Significant quantities of energetic alpha particles produced by deuterium-tritium fusion reactions are expected to be produced in the next generation of magnetic confinement fusion devices such as the Tokamak Fusion Test Reactor (TFTR) and the Joint Experimental Tokamak (JET). It is also expected that substantial heating of the plasma by the deuterium-tritium fusion-product alpha particles will occur as they slow down classically. How well the energetic alpha particles are confined within the plasma will be one of the most significant questions to be answered. Currently under study are various anomalous processes which could alter the slowing down of the alpha particles and their energy transfer characteristics to the plasma. These anomalous processes could lead to loss of the fast alphas from the central portion of the plasma or these processes could perhaps change the rate at which the fast alpha particles slow down and heat the ions and electrons in the plasma so as to sustain the fusion reaction. The anomalous loss of alpha particles from the central portion of the plasma being heated to ignition could increase the $n\tau_E$, the auxiliary heating power, and the $\beta$ required for ignition. Anomalous ion heating by alpha particles could lead to a reduction in ignition requirements. In addition, the loss of alpha particles from the plasma could result in accelerated erosion of the reactor first wall from blistering due to bombardment by the escaping energetic alpha particles.

Given the large costs and lead times associated with reactor-sized expriments, it is desirable to determine as early as possible whether the fusion-product alpha particles slow down in a classical manner through binary coulomb collisions or whether they instead are subject to anomalous processes prior to thermalization.

The first generation of deuterium-tritium burning tokamak devices is unlikely to provide answers regarding alpha particle confinement through the power balance characteristics alone of these devices. At $Q=1$, alpha particle heating will account for only about 1/5 of the input power to the plasma, even if the alpha particles thermalize completely before they are lost. Because of the importance of understanding alpha particle behavior in a fusing plasma, a diagnostic is needed to measure the slowing down spectrum of the confined alpha particles.

Therefore, the present invention provides a means and method for providing an accurate analysis of the behavior in a magnetically confined plasma of the deuterium-tritium fusion-product energetic alpha particles. The present invention involves measuring the velocity distribution of the confined energetic alpha particles by seeding the fusion plasma with a stable element which could undergo nuclear reactions with the alpha particles to produce radioactive product nuclei. A fraction of these product nuclei are then captured by a probe at the edge of the plasma, which is subsequently withdrawn to a low-background area to count the decays. This radiochemical technique makes use of generally developed techniques and does not require a great deal of development and expense.

OBJECTS AND SUMMARY OF THE INVENTION

Therefore, in view of the above, it is an object of the present invention to provide for the accurate measurement of the energy distribution of energetic alpha particles in a magnetically confined plasma.

It is another object of the present invention to provide improved diagnostics for fast alpha particles produced by deuterium-tritium fusion reactions in a magnetically contained energetic plasma.

Still another object of the present invention is to inject into a hot plasma confined by a magnetic field a stable element capable of undergoing nuclear reactions with energetic alpha particles in the plasma to produce radioactive product nuclei from which the alpha particle energy distribution may be measured.

A further object of the present invention is to provide a better understanding of alpha particle behavior in a magnetically confined plasma undergoing deuterium-tritium fusion reactions.

A still further object of the present invention is to provide a radiochemical technique for measuring the behavior of alpha particles in a magnetically confined energetic plasma which offers near term feasibility without large development costs.

These and other objects of the present invention are provided for by seeding a fusion plasma with a stable element which undergoes nuclear reactions with the energetic alpha particles in the plasma. A fraction of these radioactive product nuclei are then captured by a probe at the edge of the plasma, which is subsequently withdrawn to a low-background area to count the decays. By means of this radiochemical technique the energy distribution of the energetic alpha particles may be accurately measured. In a preferred embodiment, diborane gas ($B_2H_6$) is introduced into the plasma to produce radioactive $^{13}N$ by the reaction $^{10}B(\alpha,n)^{13}N$. Using conventional techniques, the radioactivity of a probe which collects the $^{13}N$ is then measured. The $^{13}N$ decays almost exclusively by positron emission with a convenient half-life of 10 minutes.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, in which:

DESCRIPTION OF THE PREFERRED EMBODIMENTS

Initially described herein is a prior art approach for analyzing the energy distribution of energetic alpha particles produced in a deuterium-tritium fusion plasma confined in the shape of a toroid by a magnetic field. This prior art approach does not form a part of the present invention and is described herein for instructional purposes and to indicate problems encountered in the prior art.

Figure 1:
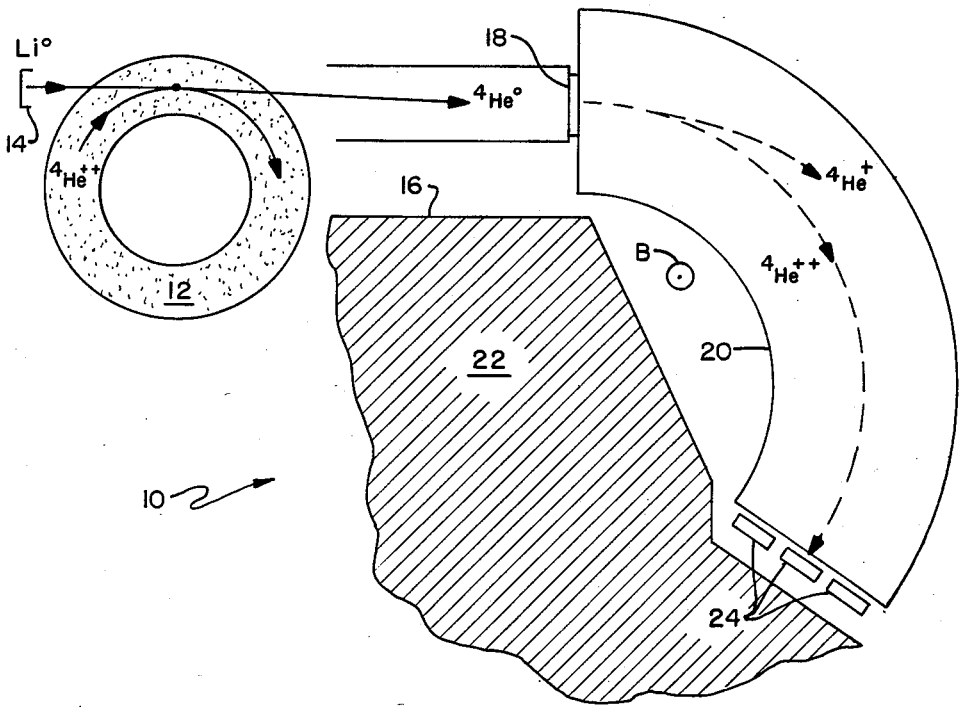
FIG. 1 is a top planar view of a simplified schematic diagram of a neutral helium analyzer used in a prior art alpha particle energy distribution measurement approach wherein stripped helium ions are magnetically deflected to effect momentum analysis and shielding of the detectors.

Referring to FIG.1, there is shown a top planar view of a simplified schematic diagram of a prior art nuclear diagnostic system 10 for measuring the energy distribution of alpha particles in a magnetically confined plasma. The nuclear diagnostic system includes a neutral beam source 14 which provides an energetic beam of $Li^{o}$ nuclei. The $Li^{o}$ beam is directed toward an incident upon a toroidal-shaped plasma 12.

The deuterium plasma 12 is generally confined in a toroidal shape by means of a strong magnetic field (B) generated by a plurality of magnets (not shown) arranged in a generally circular configuration. Magnetic coupling with the charged particles of the plasma results in the generation of a plasma current, which in FIG. 1 is shown by the direction of the arrow therein. The high temperatures and density of the plasma may be sustained by a number of means including ion cyclotron resonant frequency (ICRF) heating or by neutral beam injection wherein energetic neutral particles are directed into the plasma and energy is transferred via coulomb collisions. The energetic plasma is comprised of approximately 90% deuterons and tritons, and 10% helium ions. The high energies of the particles within the plasma cause the fusing of atoms, such as deuterium and tritium, and the resulting production of energy.

The $Li^{o}$ nuclei undergo a double charge exchange reaction with the $^{4}HE^{++}$ ions in the plasma as follows:

$$^{6}Li^{o}+^{4}He^{++}\rightarrow^{6}Li^{++}+^{4}He^{o}$$

The double charge exchange reaction results in much less severe background problems than in the case of observing the doppler-shifted radiation following a single charge exchange reaction. The signal to be detected from the single charge exchange process is of approximately the same intensity as bremsstrahlung, which itself constitutes only a small fraction of the background near 300 Å.

The charge-exchange cross sections for $He^{++}$ decline rapidly at relative velocities above $\approx4\times10^8$ cm/sec because the orbital velocities of the bound electrons in helium are of this order. Since the deuterium-tritium fusion-product alpha particles are generated at $\approx1.3\times10^9$ cm/sec, the doping beam incident upon the energetic plasma must be capable of velocities about as high as the velocity at which the alpha particles are generated (birth velocity), which corresponds to 880 keV/amu, in order to have a significant probability of charge exchange. This velocity requirement and neutral beam generation technical realities require the use of negative ions as precursors to a neutral beam.

In order to minimize cost, use of the lightest doping atom possible is desirable. The most obvious candidate for a double charge-exchange doping beam is $^{3}He$, for which negative ions can be made in adequate quantity (10's of mA). However, the $He^{o}$ resulting from neutralization of $He^{-}$ is predominantly in a long-lived metastable state making it extremely difficult to determine either the double charge-exchange cross section for the metastable component of the beam or the percentage of the beam in the ground state. Further, the metastable portion of the beam could not be quenched without ionizing most of it. Thus, the next lightest atom, $^{6}Li$, is selected as the probe beam. The beam resulting from neutralization of $^{6}Li^{-}$ is primarily in the ground state or in a state which will rapidly decay to the ground state.

From FIG. 1, it can be seen that $^{4}He^{o}$ is produced from the neutralization of the alpha particles in the plasma and escapes from the toroidal-shaped, magnetically confined plasma. The He neutrals are directed through a duct 16 from the toroidal plasma 12 and are incident upon a stripping foil on a ladder 18 which strips most of the $He^{o}$ back to the alpha particles, which are then projected into an evacuated trajectory chamber 20. A magnetic field is applied perpendicularly to the direction of travel of the alpha particles so as to deflect the energetic alpha particles and direct them upon energy sensitive solid state detectors 24. As shown in the figure, the B- field is directed out of the plane of the figure and produces a semi-circular trajectory of the $^{4}He^{++}$ particles. The B- field may be produced in a conventional manner such as by a magnet and provides for the momentum analysis of the $^{4}He^{++}$ particles and permits the energy sensitive detectors 24 to be located behind radiation shielding 22 which primarily shields the environment from energetic neutrons. The energy sensitive detectors are position-sensitive surface detectors which provide for energy resolution in addition to that provided by the B- field and also permit the rejection of much residual neutron noise, since neutrons would generally only lose small amounts of energy in the thin energy sensitive detectors 24.

Figure 2:
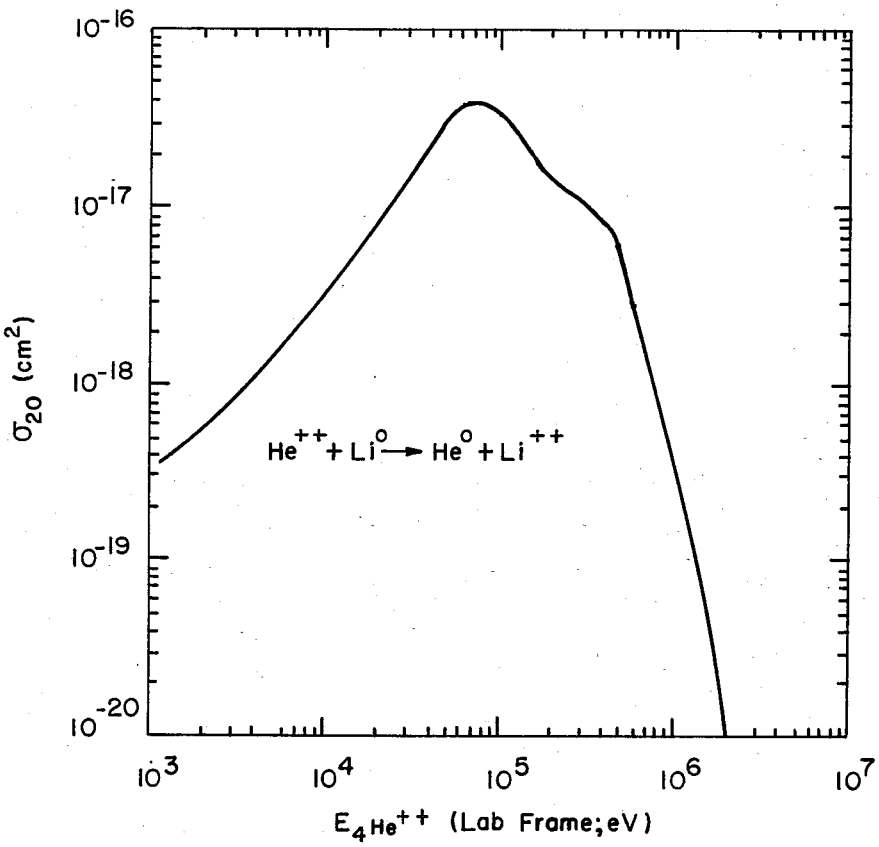
FIG. 2 shows the calculated double charge-exchange cross section for the $He^{++}+Li^{o}\rightarrow He^{o}+Li^{++}$ reaction which has been extrapolated below 28 keV and about 800 keV as contemplated by the approach shown in FIG. 1.

Referring to FIG. 2, there is shown the measured cross section for the aforementioned double-charge exchange reaction as a function of energy. This curve represents a composite of the cross section measurements set forth in "Electron Capture by $He^+$ and $He^{++}$ Ions in Li Vapor," by McCullough et al., Abstracts of XII International Conference on the Physics of Electronic and Atomic Collisions, July 15–21, 1981, Vol. 2, 661 (1981) and "Single and Double Electron Transfer in $He^{++}+Li$ Collisions," Murray et al., to be published in Phys. Ref. A. The curve has been extrapolated at energies below 28 keV and above 800 keV.

The measured cross section curve for this reaction shown in FIG. 2 was used to calculate the characteristics of the $He^o$ flux resulting from double charge exchange. The calculations were performed for two assumed alpha particle velocity distribution functions. The first, termed the "classical distribution," is that which results from the slowing down of the alpha particles entirely by classical binary collisions in a toroidal plasma with $T_e=10$ keV, $T_i=20$ keV, and $n_e=1\times10^{14}$ $cm^{-3}$. The other distribution, termed "nonclassical" is the classical distribution multiplied by a $(v/v_o)^4$ term, where $v_o$ is the velocity at which the fusion-product alpha particles are generated. This type of distribution might result from a process which causes rapid loss of the fast alpha particles. Results based upon these two distributions provide an indication of the sensitivity of the emerging $^4He^o$ flux to gross variations in the alpha particle containment.

Figure 3:
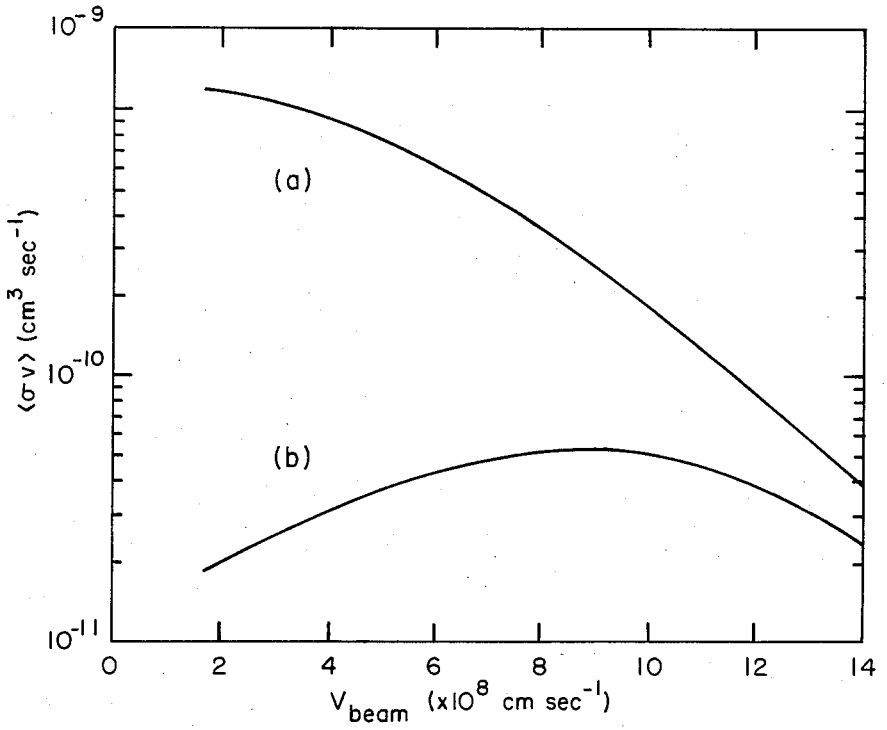
FIG. 3 shows the calculated values of $<\sigma v>$ for the (a) classical and (b) nonclassical alpha particle velocity distribution functions.

FIG. 3 shows the calculated cross section $<\sigma v>$ as a function of the $Li^o$ doping beam velocity for the classical (a) and the assumed nonclassical distribution (b). From FIG. 3 it can be seen that the velocity of the doping beam will produce different count rates and (below $v_{beam}=10^9$ cm/sec) opposing gradients as a function of beam energy, depending upon which of the two alpha distribution functions exist in the plasma.

Figure 4A:
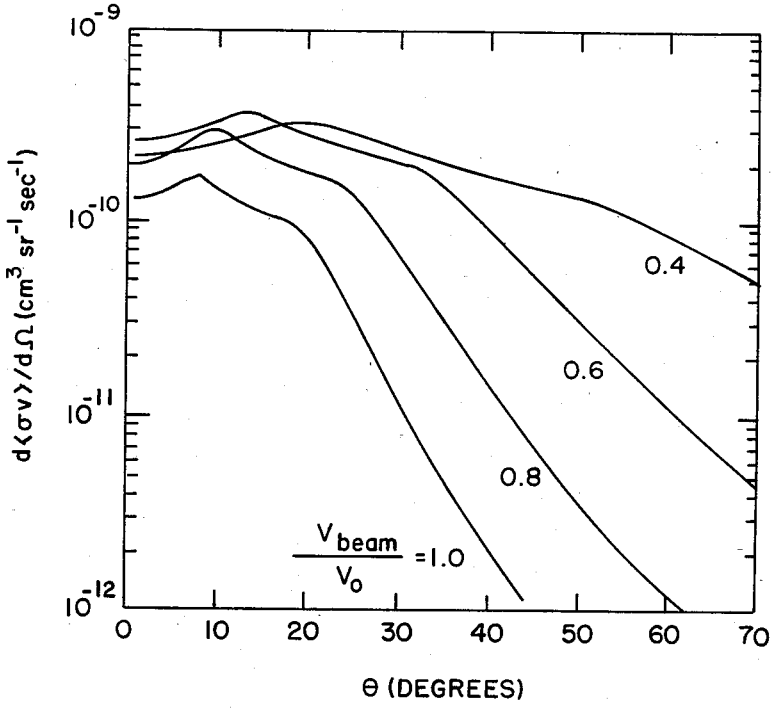
FIGS. 4A and 4B respectively show the calculated differential $<\sigma v>$ for the (a) classical and (b) nonclassical alpha particle velocity distributions shown as a function of the angle between the neutral particle detector and the doping beam for several beam velocities where $v_o$ is the alpha birth velocity of $1.3\times10^9$ cm $sec^{-1}$ for the arrangement of FIG. 1.
Figure 4B:
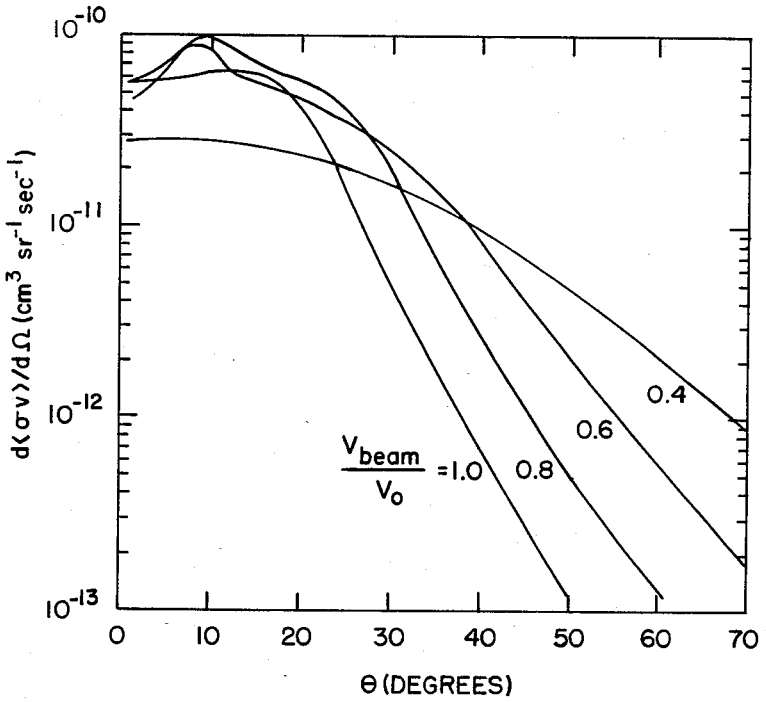

Referring to FIGS. 4A and 4B, there is shown the differential reaction rate as a function of detector angle at various $Li^o$ beam velocities for the classical and nonclassical alpha particle velocity distributions, respectively. A detector angle of 0° represents a detector positioned along the beam line of the incident particles. From FIGS. 4A and 4B, it can be seen that the $He^o$ analyzer must be located in a forward direction if the signal level is to be maximized. This is a result of the velocity selectivity of the reaction where those alpha particles traveling generally parallel to the incident neutral beam particles will generally have the lowest relative velocities.

Figure 5A:
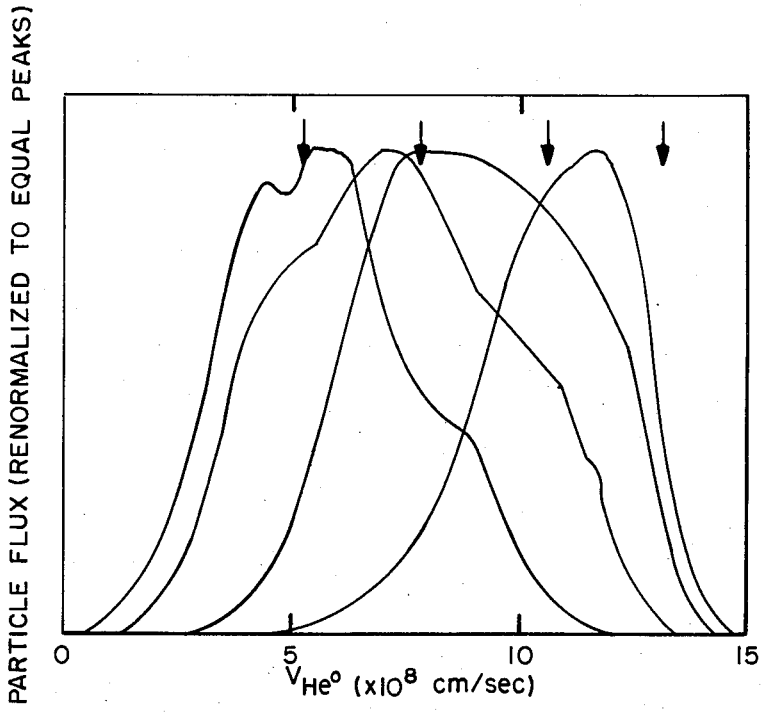
FIGS. 5A and 5B respectively show the calculated velocity distributions (normalized to the same peak amplitude) of the emerging $He^{o}$ at 20° as a function of the $Li^{o}$ beam velocity for the (a) classical and (b) nonclassical particle velocity distributions wherein the arrows indicate beam injection velocities of $v_{beam}/v_o=0.4$, 0.6, 0.8, and 1.0, where $v_o$ is the alpha particle birth velocity for the arrangement of FIG. 1.
Figure 5B:
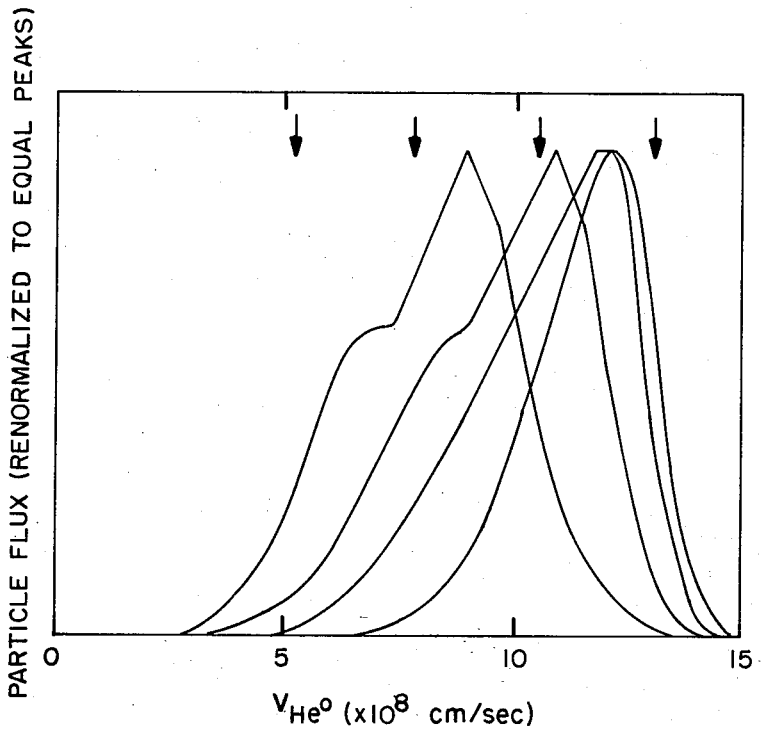

Referring to FIGS. 5A and 5B, there is shown the velocity distributions of the $He^o$ emerging at 20° relative to the beam direction for the classical and nonclassical alpha particle velocity distributions, respectively. The calculated results are shown for four different $Li^o$ injection velocities where the arrows indicate the beam injection velocities at $v_{beam}/v_o=0.4$, 0.6, 0.8 and 1.0, where $v_o$ is the alpha particle birth velocity. From FIGS. 5A and 5B, it can be seen that for $Li^o$ velocities below $\approx1.1\times10^9$ cm/sec the shapes and centroids of the $He^o$ distributions are quite sensitive to the alpha velocity distributions. At $v_{beam}/v_o=0.8$, for example, the centroid of $He^o$ for the classical distribution is shifted down by $\approx1.7\times10^8$ cm/sec relative to the injection velocity, while for the nonclassical distribution the centroid of the $He^o$ is shifted up by $\approx1.3\times10^8$ cm/sec with respect to the beam energy. In addition, the signal forms resulting from the two assumed alpha particle velocity distributions differ markedly in shape and width and, as indicated in FIGS. 4A and 4B, have different signal intensities.

Thus, this approach using an $Li^o$ neutral beam yields a number of observables to examine the alpha particle velocity distribution function. For example, at a fixed beam energy one can measure the shape, intensity, and velocity centroid shift of the emerging $He^o$. In addition, with the capability to vary beam energy, the rate of change of the $He^o$ flux as a function of the $Li^o$ velocity may be accurately measured.

Figure 6:
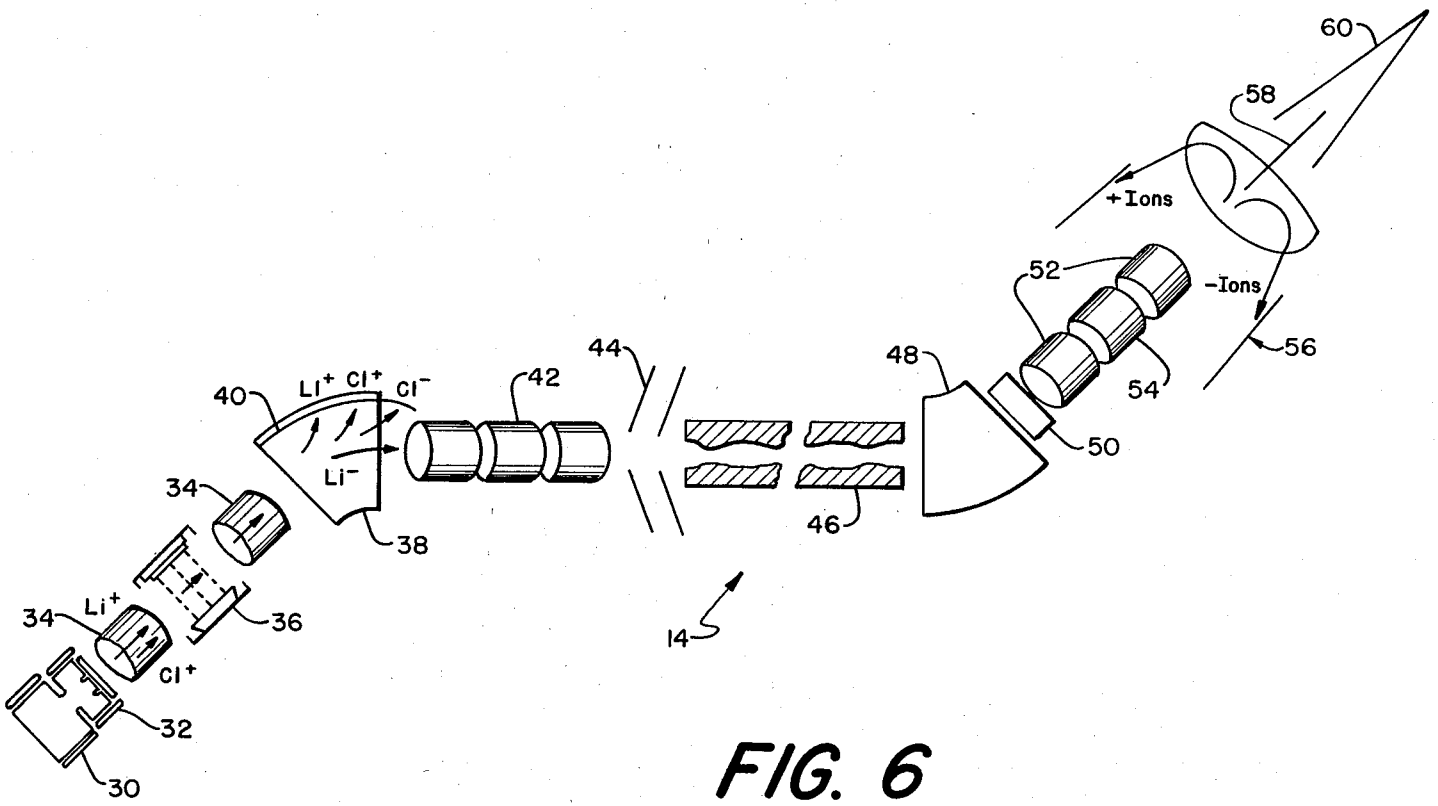
FIG. 6 is a top planar view of a simplified schematic diagram of a multi-MeV $Li^{o}$ beam source including a two-stage $Li^{o}$ source and an RF quadruple (RFQ) accelerator for use in the arrangement of FIG. 1.

Referring to FIG. 6, there is shown a top planar view of a simplified schematic diagram of a multi-MeV $Li^o$ beam source including a two-stage $Li^-$ source and an RF quadrupole (RFQ) accelerator for use in the diagnostic system 10 of FIG. 1. There are various ways in which the $Li^o$ neutrals may be produced. One approach involves a two-step process wherein $Li^+$ is extracted from an arc source with the second step involving passing the thus produced positive ions through a metal vapor where a fraction of them acquire two electrons to become negative ions. The most developed approach to high current production of $Li^+$ is with the calutron type of source developed at Oak Ridge National Laboratory. One source using this approach for producing $\approx100$ mA of $Li^-$ might consist of a $Li^+$ source using calutron technology and extracting the beam in an acceleration-deceleration mode, followed by a transverse supersonic cesium jet. Another approach involves producing the negative ions directly with a surface plasma source similar to those being developed for $D^-$ production. Although this approach has proven very attractive for making negative ions from gaseous feedstocks, it may be less suitable for producing negative ions of a substance such as lithium which has a lower vapor pressure than does the cesium which dopes the converter surface. Still another possibly feasible method for producing energetic negative ions involves the photodissociation of NaLi molecules in a molecular beam into $Na^+$ and $Li^-$ using 2350–2400 Å photons from a laser.

The first method involving calcutron technology and extracting the beam in an accel-decel mode followed by a transverse supersonic cesium jet is shown in FIG. 6. The $Li^o$ beam source 14 shown in FIG. 6 includes a charge bottle 30 filled with $Li^+$ and LiCl which is bombarded with electrons in an $Li^o$ source 32 for producing $Li^+$, $Li^-$, $Cl^+$ and $Cl^-$ ions. The thus generated $Li^+$ ions are then directed through two cold surfaces upon which stray alkali atoms from the charge exchange cell 36 collect. Between the cold surfaces 34 is positioned a transverse supersonic alkali jet 36 which directs cesium ions transverse to the $Li^+$ beam for producing collisions between the alkali ions and imparting two electrons to a fraction of the $Li^+$ ions in generating $Li^-$ ions. The various ions thus produced are subjected to the B- field of an analyzing magnet 38 which includes a region of magnetic (B) fields (not shown) to cause separation of the incoming $Li^+$, $Cl^+$, $Cl^-$, and $Li^-$ ions into linear mass columns. The $Li^-$ ions are directed into a 3-stage electromagnetic lens assembly 42 for focusing the negative ion beam and directing it into a preacceleration stage 44 comprised of several charged grids.

From the preacceleration grid stage 44, the $Li^-$ ions are directed into an RF quadrupole (RFQ) accelerator 46. RFQ accelerators, such as those being developed at Los Alamos Scientific Laboratory, are capable of accelerating the full 100 mA current in a single accelerator channel, have a large entrance aperture to accept the $Li^-$ beam, and can readily be pumped through grided ducts. A preliminary design of an RFQ to accelerate 100 mA of $Li^-$ to 6 MeV has been performed and indicates the feasibility of this approach. In one design, the input aperture radius of the RFQ accelerator 46 is large (8.4 cm, of which about half could be filled with the $Li^-$ beam) and the output beam has a radius of $\approx 1$ cm. The normalized emittance acceptance is $\approx 0.21$ cm mrad. Using 50 MHz RF at 223 kV, the RFQ accelerator length is $\approx 7$ meters. The $Li^-$ ions are electrostatically preaccelerated to 100 keV prior to injection into the RFQ accelerator 46. The capture and transmission efficiency of the RFQ accelerator 46 can be high ($\approx 93\%$ in this case) which is desirable since the $Li^-$ is difficult to produce. The energy of the RFQ accelerator may be changed as desired to meet various diagnostic requirements by such techniques as following the RFQ accelerator with independently phased cavities, varying the RF frequency, or changing the drive voltages to various sections of the RFQ accelerator.

With increased energy imparted to the $Li^-$ in the RFQ accelerator 46, the $Li^-$ is then directed through a deflection magnet 48 and thence through a set of focusing magnetic quadtrupoles 50. The thus accelerated and focused $Li^-$ beam is then transmitted through the first stage of a cryocondensation pump 52 for a neutralizer gas. Located between the cryocondensation pump stages 52 is a condensable gas neutralizer stage 54. At 6–7 MeV, a nitrogen cell has been observed to neutralize $\approx 45\%$ of a $Li^-$ beam and a hydrogen gas cell is capable of providing a neutral yield of approximately 54%. Nitrogen in the condensable gas neutralizer stage 54 is preferable since nitrogen can be kept at a much lower vapor pressure than hydrogen by cryocondensation pumping and since it is desirable to minimize the gas load to the accelerator in order to suppress premature stripping. In addition, a properly designed photodetachment neutralizer could also be utilized in the present invention for neutralizing the $Li^-$ beam. The gas neutralizer 54 is followed by an ion dump stage 56 which includes a deflection magnet (preferably air core) and cooled dumps for removing residual ions. Finally, the thus produced $Li^0$ beam is directed through a beam line calorimeter for detecting $Li^0$ beam energy.

The prior art approach thus described, while capable of providing accurate alpha particle energy distribution analysis, represents an expensive implementation requiring extensive development of existing neutral particle beam technologies. The present invention, however, can be implemented without extensive development of existing technologies and thus represents a presently feasible approach to accurate alpha particle energy distribution analysis for use with a fusion plasma.

The present invention contemplates a radiochemical technique involving the seeding of an energetic plasma with a stable element which undergoes nuclear reactions with the alpha particles to produce radioactive product nuclei. A fraction of these product nuclei are captured by a probe at the edge of the plasma, with the probe subsequently withdrawn to a low-background radiation area to count the decays of the thus produced radioactive nuclei. The present invention is capable of producing accurate energy distribution measurements of the energetic alpha particles, particularly those alpha particles having high energies.

Ideally the isotope utilized for interaction with the confined plasma should be in the lower portion of the periodic table since increasing coulomb barrier heights cause alpha particle-induced reaction cross sections to be reduced rapidly as the atomic numbers of the target nuclei increase. In addition, a heavy contaminant would radiate much more energy from the plasma through atomic processes than would a light contaminant. Additional properties of potentially useable isotopes would include the generation of a product nucleus having a useable half-life, i.e., greater than 1 second and less than a few hours. Very short half lives (less than a second) make counting difficult, and very long half lives reduce the signal-to-background ratio while either limiting the number of tokamak discharges which can be measured or requiring any counting systems to analyze different probes simultaneously. In addition, the target nucleus must either be stable or have a very long half-life and the alpha-induced reaction must have a center-of-mass threshold energy which is sufficiently less than 3.5 MeV for the reaction to have a reasonable cross section.

Various isotopes were evaluated for their potential use as double charge exchange reactants with alpha particles in the energetic plasma. Table I includes the most promising reactions which were considered and their reaction Q-values. Of these, the $^{26}Mg(\alpha, p)^{29}Al$ reaction appears unuseable for detection of thermonuclear alpha particles since its threshold energy in the laboratory frame is 3.23 MeV, barely less than the thermonuclear alpha birth energy. The $(\alpha,p)$ cross section should be negligibly small since the emerging low energy protons would have to compete with the $(\alpha,\eta)$ and $(\alpha,\gamma)$ channels, both of which are open. The reaction $^{25}Mg(\alpha,p)^{28}Al$ appears somewhat more promising since

TABLE I

| | Reactions | Q-values (MeV) |
|---|---|---|
| (1) | $^{10}B(\alpha,n)^{13}N$ | +1.06 |
| (2) | $^{14}N(\alpha,\gamma)^{18}F$ | +4.4 |
| (3) | $^{25}Mg(\alpha,p)^{28}Al$ | −1.19 |
| (4) | $^{26}Mg(\alpha,p)^{29}Al$ | −2.86 |

its threshold energy is well below 3.5 MeV. However, this cross section, which also apparently has not been measured at these energies, is probably small due to competition decay of the compound nucleus through the open $(\alpha,\gamma)$ and $(\alpha,n)$ channels. The $(\alpha,\gamma)$ Q value is +11.13 MeV, while the $(\alpha,n)$ Q value is +2.65 MeV, such that these channels together should dominate the reaction width. However, the cross section for this reaction once determined by measurement may prove to be useable in the present invention.

The $^{14}N(\alpha,\gamma)^{18}F$ reaction has a threshold energy of 0.0 MeV, and the product nucleus decays by positron emission width $T_{\frac{1}{2}}=1.87$ hour. However, the gamma ray yield curve, which consists of scattered isolated narrow resonances, suggests that the energy averaged cross section may be relatively small making this a doubtful candidate for use in the present invention.

The reaction used in a preferred embodiment of the invention is $^{10}B(\alpha,n)^{13}N$. With a positive Q-value, the threshold for this reaction is 0.0 MeV, but its cross section does not begin to become significant until approximately 1.5 MeV. Boron is sufficiently light so as to not significantly affect the radiation balance of the plasma if seeded at concentrations of a fraction of a percent. The product nucleus, $^{13}N$, decays almost exclusively by positron emission with a convenient half-life of 10 minutes. Thus, one can detect the decays by using GeLi or sodium iodide detectors for the 0.511 MeV annihilation radiation.

The boron could be introduced straightforwardly as diborane gas ($B_2H_6$) which, being comprised solely of boron and hydrogen, would not contribute any heavier impurities. The time dependence of the central density and density profile of the fully ionized boron ions can be measured spectroscopically by observing the radiative decay of excited hydrogen-like boron ions produced by the charge exchange of the hydrogen atoms in a neutral doping beam with fully ionized boron atoms. This technique has been used successfully on PDX and other tokamaks to measure the concentration of impurities. The simplest way to insure that boron reaches the center of the plasma is to contaminate the fill gas with a $\approx 1\%$ diborane prior to the initiation of the discharge. If this proved undesirable due to the additional consumption of volt-seconds during start up, then the boron could be injected as simply either boron or frozen diborane.

Emerging $^{13}N$ ions are collected at the edge of the plasma with a probe before they hit the limiter. A probe subtending 1% of the poloidal angle would intercept on the order of 1% of the $^{13}N$ produced. Carbon is a desirable material for the probe, since it would retain the embedded nitrogen and is a proven limiter material. A limiter could be carried by a "rabbit" to a low background area for radiation counting after the gas is introduced into the plasma. Carbon has the additional advantage in that both of its naturally occurring isotopes, $^{12}C$ and $^{13}C$, have very low thermal neutron cross sections and even if they undergo neutron capture with fast neutrons will not significantly affect the counting background. The various isotopes of carbon thus produced are either very stable, possess a long half-life, or decay by $\beta^-$ emission.

In practice, several probe materials could be evaluated to determine which one yields the lowest background radiation in the vicinity of the 0.511 MeV annihilation peak. With a carbon collector, for instance, the $^{12}C(p,\gamma)^{13}N$ reaction could give rise to a significant annihilation radiation bckground if there is a large flux of unconfined protons at several MeV. Another material which might be useful as a collector is tungsten, which would not give rise to $\beta^+$ emitters.

The probe is calibrated to determine what fraction of the $^{13}N$ produced in a discharge is collected by seeding the plasma with a percent or so of ordinary nitrogen by pellet injection. The recombination radiation is then monitored to determine the concentration of nitrogen in the discharge. Sufficient nitrogen should be embedded in the carbon probe to allow this amount of nitrogen to be determined by conventional surface analysis techniques in providing calibration of the fraction of $^{13}N$ actually captured by the probe.

Figure 7:
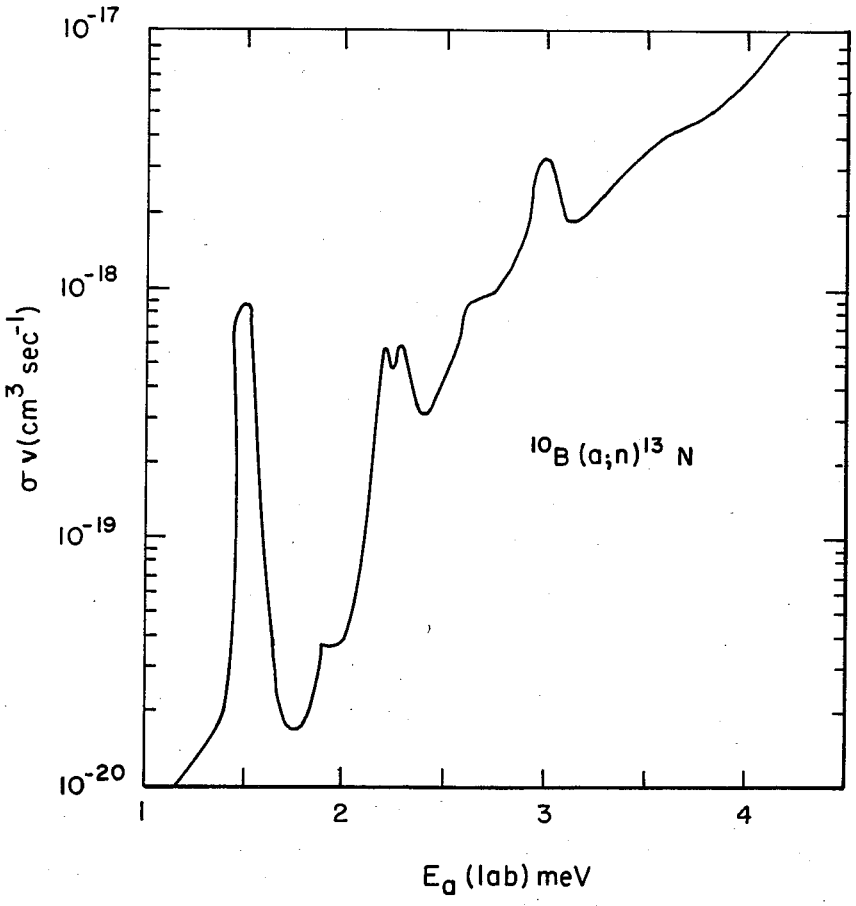
FIG. 7 shows the calculated $\sigma v$ curve for the reaction $^{10}B(\alpha,n)^{13}N$ over an alpha particle energy range of 1-5 MeV as contemplated for use in the present invention.

Shown in FIG. 7 is the $\sigma v$ curve for the $^{10}B(\alpha,n)^{13}N$ reaction. From the calculated cross section values shown in FIG. 7 it can be seen that this reaction will primarily be sensitive to the higher energy alpha particles within the plasma.

Assuming that the fast alpha particle velocity distribution is "classical" as described above, which assumes that the alpha particles slow down through two body coulomb collisions, the signal level produced in the present invention may be estimated. Assuming that a $Q=1.1$ plasma (approximately energy break even) in a tokamak reactor is seeded with $^{10}B$ at a density of $1\times10^{11}$ cm$^{-3}$ and an average density of fast alpha particles of $9.6\times10^{10}$ cm$^{-3}$, this would result in a total production rate of $6.4\times10^{10}$ sec$^{-1}$ if no anomalous processes occur in the slowing down process. If the hot part of the pulse persists for 0.25 sec, this would produce $1.6\times10^{10}$ reactions per discharge. If 1% of the $^{13}N$ were collected on the probe this would give a sample of $1.6\times10^{8}$ nuclei which, during the first 10 minutes, would decay at an average rate of $1.3\times10^{5}$ decays/sec. If the 0.51 MeV annihilation radiation is detected with $\approx 10\%$ efficiency, the count rate could be $\approx 1.3\times10^{4}$ sec$^{-1}$. If the counting takes place between tokamak pulses in an area well shielded from the activated materials around the tokamak, the background in the vicinity of 0.51 MeV will be much lower than this (by several orders of magnitude). Thus, even if the fraction of $^{13}N$ which could be captured by the probe was considerably less than 1%, there would be an adequate signal level for detection. In addition, a factor of 5 could likely be sacrificed in the count rate by the use of diborane gas with natural boron (the isotopic abundance of $^{10}B$ is 18.8%) instead of requiring that it be isotopically enriched in $^{10}B$.

There are two primary reactions that will occur between fusion products and plasma contaminants to produce $^{13}N$ as a background. These are the $^{14}N(n,2n)^{13}N$ reaction and the $^{16}O(p,\alpha)^{13}N$ reaction. The first of these reactions has a reaction Q value of $-10.55$ MeV, and does not have an appreciable cross section for laboratory energies below 12 MeV. Even then the cross section is lower than what might be expected—6 millibarns at 14.1 MeV in the laboratory frame—due to competition with six other reactions (five of which have Q values which are less negative than that of the (n, 2 n) reaction). Neutrons, of course, are not confined in the plasma and their energies are quickly reduced by scattering to values below 12 MeV. Consequently the yield of $^{13}N$ due to a density of $^{14}N$ of $2\times10^{11}$ cm$^{-3}$ in the plasma would be only $\approx 1.3\times10^{5}$ sec$^{-1}$ at a thermonuclear $Q=1$. This is much smaller than the production rate due to the $^{10}B$ reaction which was estimated earlier. The total production rate of $^{13}N$ from $^{14}N$ will, of course, be somewhat higher than estimated here due to reactions involving $^{14}N$ on the vacuum vessel walls. The other reaction $^{16}O(p,\alpha)^{13}N$, has a reaction Q value of $-5.21$ MeV, and has no significant cross section below a laboratory frame energy of 7 MeV. The only protons present with this much energy will have originated from $^{3}He(d,p)^{4}He$ reactions in which the proton emerges with about 14.7 MeV. The $^{3}He$ is produced through approximately half of the d—d fusion reactions. The cross section for the $^{16}O(p,\alpha)^{13}N$ reaction is highly resonant in the 7–15 MeV range, with an average value of $\approx 2.5\times10^{-26}$ cm$^2$ (slightly higher than the average value of the $^{10}B(\alpha,n)^{13}N$ cross section between 3.0 and 3.5 MeV). The protons take a few times longer to slow down through the reacting range of energies than do the alpha particles, but there would be far fewer ($10^4$ less) of these energetic protons than of the fusing product alphas in a plasma which starts with a D-T mixture. Accordingly, these reactions would not be expected to constitute significant background problems.

An analysis of the "nonclassical" alpha particle velocity distribution, which is simply the "classical" distribution weighted by a $(v/v_o)^4$ term where $v_o$ is the alpha particle birth velocity of $1.3\times10^{9}$ cm/sec, results in an estimated 30% decrease in the production of $^{13}N$ due to the fact that this approach is much more sensitive to high energy alpha particles than to low energy alphas. Therefore, this diagnostic would be useful for detecting the presence of high energy alpha particles and it would be sensitive to even higher energy nonthermal nuclear alphas from beam-target reactions. However, this diagnostic would be of limited value in discriminating between velocity distributions which differed only in their lower energy portions.

Figure 8:
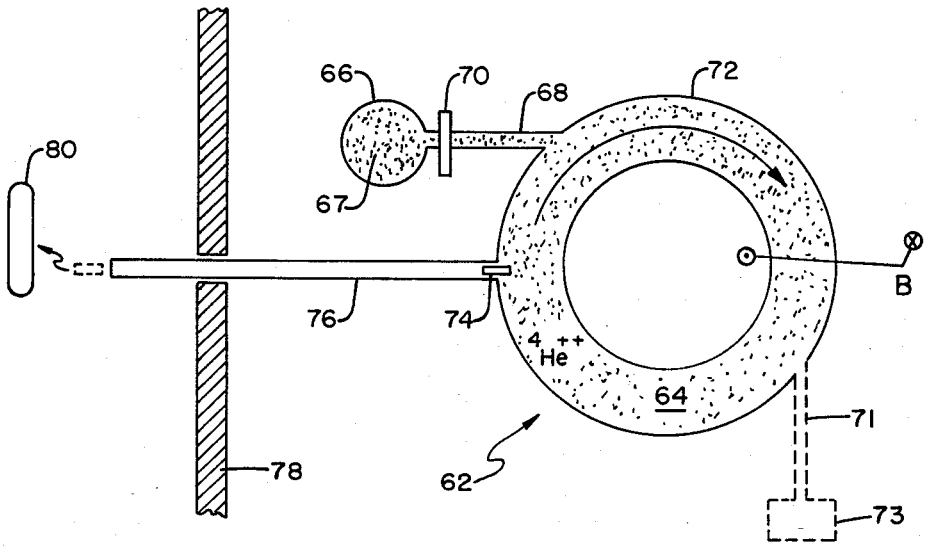
FIG. 8 is a simplified schematic diagram of an arrangement for seeding a fusion plasma with a stable element in accordance with the radiochemical approach of the present invention.

Referring to FIG. 8, there is shown in simplified schematic diagram form an alpha particle energy distribution measurement system 62 in accordance with the present invention. A fusing toroidal plasma 64 is confined by means of a magnetic (B) field in a plasma containment vessel 72. The direction of the confining, circular B- field is shown in FIG. 8. Magnetic coupling of the charged particles of the plasma 64 results in the generation of a plasma current, which in FIG. 8 is shown by the direction of the arrow therein. Energetic $^{4}He^{++}$ are produced in the fusing plasma 64.

A gas bottle 66 containing a stable element is coupled to the plasma containment vessel 72 by means of a gas flow tube 68. Positioned within the gas flow tube 68 is a combination valve/pressure sensor 70 for regulating the flow of the stable gas from the gas bottle 66 to the plasma containment vessel 72 for controlling the concentration of the stable gas in the fusing plasma. As stated previously, diborane gas is contained within the gas bottle 66 for seeding in the plasma 64 for producing radioactive $^{13}N$ by the reaction $^{10}B(\alpha,n)\ ^{13}N$.

Shown in dotted line form in FIG. 8 is another embodiment of the present invention involving the use of a boron or frozen diborane source 73 coupled to the plasma containment vessel 72 by means of a boron injection tube 71. Boron or frozen diborane is generated in source 73 by conventional means and displaced along and within the injection tube 71 into the fusing plasma 64 within the plasma containment vessel 72. The boron or frozen diborane, which may be in the form of pellets, then undergoes the aforementioned reaction to produce radioactive $^{13}N$ nuclei.

The radioactive $^{13}N$ are then collected by absorption by a probe 74 which is located adjacent to the periphery of the fusing plasma 64. Once the radioactive $^{13}N$ nuclei have collected on probe 74, it is displaced along an evacuated, or inert gas filled, transport tube 76 by conventional means. The probe 74 is thus displaced to an area of low radiation such as behind a radiation shield 78 isolating it from the fusing toroidal plasma 64. The radioactivity of the probe 74 is then measured by a conventional radiation detector/counter 80. It is from the measured level of radiation that the energy distribution of the alpha particles within the toroidal plasma 64 can be accurately determined. In a preferred embodiment of the present invention, volatile diborane gas is seeded in an approximately 1% concentration relative to the hydrogen content of the fusing plasma.

While the present invention has been described in terms of use in measuring the velocity distribution of energetic alpha particles in a toroidally shaped plasma confined by a magnetic field, it will be apparent to those skilled in the art that it has equal applicability for use with an inertially confined plasma. In this application, the diborane gas would be provided in a frozen pellet together with a deuterium-tritium mixture for heating by a very short burst of energy from either laser beams or beams of high-energy charged particles. On the order of 1% diborane gas would be utilized in this application of the present invention in a conventional inertial confinement device.

There has thus been shown a means and method for measuring the velocity distribution of confined energetic alpha particles resulting from deuterium-tritium fusion reactions in a magnetically contained plasma. The present invention makes use of a radiochemical technique in which boron nuclei undergo a nuclear reaction—namely $^{10}B(\alpha,n)\ ^{13}N$—with the energetic alphas in the plasma to produce radioactive $^{13}N$ product nuclei which are then captured by a probe. The decay rate of the $^{13}N$ is then detected by using a conventional radiation detector in determining the concentration of $^{13}N$ in the probe and the velocity distribution of the alpha particles within the plasma.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. In an energetic plasma confined by a high strength magnetic field wherein deuterium and tritium undergo fusion reactions in producing energetic alpha particles having a range of energies, a system for determining the numbere of said confined alpha particles having energies greater than a threshold energy level comprising:

a source of nuclei capable of undergoing a nuclear reaction with alpha particles having energies greater than said threshold energy level and of producing radioactive product nuclei having a measurable half-life, said nuclei having a low atomic number and a low thermal neutron collision cross-section;

connecting means for coupling said source of nuclei to said plasma and for directing said nuclei into said plasma in producing said nuclear reaction;

a probe positioned adjacent said plasma for collecting said radioactive product nuclei following said nuclear reaction; and radiation sensitive means for measuring the radioactivity of said probe arising from the radioactive product nuclei collected by said probe, wherein said radioactivity represents the number of radioactive product nuclei in said probe, in determining the number of energetic alpha particles in the plasma having energies greater than said threshold energy level.

2. A system in accordance with claim 1 wherein said radiation sensitive means is in an area of low radiation with said system further including transport means coupled to said plasma for displacing said probe to said area of low radiation in the vicinity of said radiation sensitive means.

3. A system in accordance with claim 2 wherein said transport means includes an evacuated tube for carrying said probe to the area of low radiation.

4. A system in accordance with claim 2 wherein said transport means includes a tube filled with an inert gas for carrying said probe to the area of low radiation.

5. A system in accordance with claim 1 wherein said probe is comprised of carbon.

6. A system in accordance with claim 1 wherein said probe is comprised of tungsten.

7. A system in accordance with claim 1 wherein said source of nuclei includes diborane gas which undergoes the nuclear reaction $^{10}B(\alpha,n)^{13}N$ with the energetic alpha particles in said plasma to produce radioactive $^{13}N$ nuclei.

8. A system in accordance with claim 7 wherein approximately a 1% concentration of $^{10}B$ nuclei is provided in said plasma.

9. A system in accordance with claim 1 wherein the radioactive product nuclei decay primarily by positron emission with a half-life on the order of minutes.

10. A system in accordance with claim 1 wherein said source of nuclei includes a source of boron pellets and said system further includes injection means coupling said source of boron pellets to said plasma for directing said boron pellets into said plasma in initiating said nuclear reactions.

11. A system in accordance with claim 1 wherein said source of nuclei includes a source of frozen diborane and said system further includes injection means coupling said source of frozen diborane to said plasma for directing said frozen diborane into said plasma in initiating said nuclear reactions.

12. A system in accordance with claim 1 wherein said plasma is confined by said magnetic field in the shape of a toroid.

* * * * *